US008070493B2

(12) United States Patent  (10) Patent No.: US 8,070,493 B2
Wilson  (45) Date of Patent: *Dec. 6, 2011

(54) MEASUREMENT SYSTEM APPARATUS AND METHOD OF TEACHING UNITS OF MEASUREMENT

(76) Inventor: Perry Wilson, Somarville, TN (US)

( * ) Notice: Subject to any disclaimer, the term of this patent is extended or adjusted under 35 U.S.C. 154(b) by 1007 days.

This patent is subject to a terminal disclaimer.

(21) Appl. No.: 11/805,377

(22) Filed: May 23, 2007

(65) Prior Publication Data

US 2007/0298390 A1   Dec. 27, 2007

Related U.S. Application Data

(63) Continuation-in-part of application No. 11/290,856, filed on Nov. 30, 2005, now Pat. No. 7,632,099.

(51) Int. Cl.
*G09B 19/02*   (2006.01)

(52) U.S. Cl. ........................................ 434/187; 434/188

(58) Field of Classification Search .................. 434/187, 434/188, 191, 195, 196, 200, 204, 205, 207
See application file for complete search history.

(56) References Cited

U.S. PATENT DOCUMENTS

| | | | |
|---|---|---|---|
| 480,119 A | | 8/1892 | McCourt |
| 571,567 A | * | 11/1896 | Jouve ............................ 434/195 |
| 1,471,437 A | * | 10/1923 | Wood ............................ 434/195 |
| 1,649,579 A | * | 11/1927 | Edison .......................... 429/221 |
| 2,494,469 A | * | 1/1950 | Booth ........................... 434/196 |
| 2,494,497 A | * | 1/1950 | Trapnell ....................... 434/204 |
| 2,635,355 A | | 4/1953 | Thompson et al. |
| 2,835,988 A | * | 5/1958 | Hilkene ........................ 434/195 |
| 2,926,432 A | * | 3/1960 | Helberg ........................ 434/196 |
| 2,930,146 A | * | 3/1960 | Cassel ........................... 434/196 |
| 3,171,217 A | * | 3/1965 | Birdsall ........................ 434/196 |
| 3,204,343 A | * | 9/1965 | Pollock ......................... 434/195 |
| 3,229,388 A | * | 1/1966 | Smith ........................... 434/195 |
| 3,465,453 A | | 9/1969 | Sqanga |
| 3,837,569 A | * | 9/1974 | Bradbury et al. ........... 235/70 R |
| 4,075,770 A | * | 2/1978 | Lill ............................... 434/187 |
| 4,144,657 A | * | 3/1979 | Dumovich .................... 434/187 |
| 4,614,042 A | * | 9/1986 | Maurer .......................... 33/494 |
| 4,838,794 A | | 6/1989 | Coddington |
| 5,297,965 A | * | 3/1994 | Manancero ................... 434/195 |
| 5,421,732 A | * | 6/1995 | Taylor ........................... 434/195 |
| 5,597,308 A | * | 1/1997 | Woldenberg et al. ......... 434/196 |
| 5,679,002 A | * | 10/1997 | Scelzo .......................... 434/196 |

(Continued)

OTHER PUBLICATIONS

Davidson, Jessica; "Using the Cuisenaire Rods" Teachers Manual. 1969, 1983; Selected pages are provided; Cuisenaire Company of America, Inc.; New Rochelle, New York, USA.

*Primary Examiner* — Kurt Fernstrom

(74) *Attorney, Agent, or Firm* — Raymond R. Ferrera; Adams and Reese LLP

(57) ABSTRACT

A measurement system apparatus is provided, which includes an elongated bar and a plurality of discrete measurement unit pieces received along the bar. The elongated bar is metered in accordance with a measurement system. Each measurement unit piece represents an incremental unit of the measurement system. A method is also provided for instructing a student as to a measurement system which generally includes the steps of providing an elongated bar, with the bar being metered along its length to reflect incremental units of a measurement system, providing a plurality of measurement unit pieces corresponding to the metered incremental units of the measurement system, and placing selected measurement unit pieces along the elongated bar.

14 Claims, 4 Drawing Sheets

U.S. PATENT DOCUMENTS

| | | | |
|---|---|---|---|
| 5,683,252 A * | 11/1997 | Tsao | 434/195 |
| 6,033,282 A | 3/2000 | Lin | |
| 6,192,594 B1 * | 2/2001 | Wackowski | 33/494 |
| 6,206,701 B1 | 3/2001 | Kohlberg | |
| 6,243,959 B1 * | 6/2001 | Monck | 33/494 |
| 6,575,754 B2 * | 6/2003 | Salvo | 434/195 |
| 6,758,675 B2 * | 7/2004 | Karabaic | 434/189 |
| 7,104,799 B1 * | 9/2006 | Sansing | 434/195 |

* cited by examiner

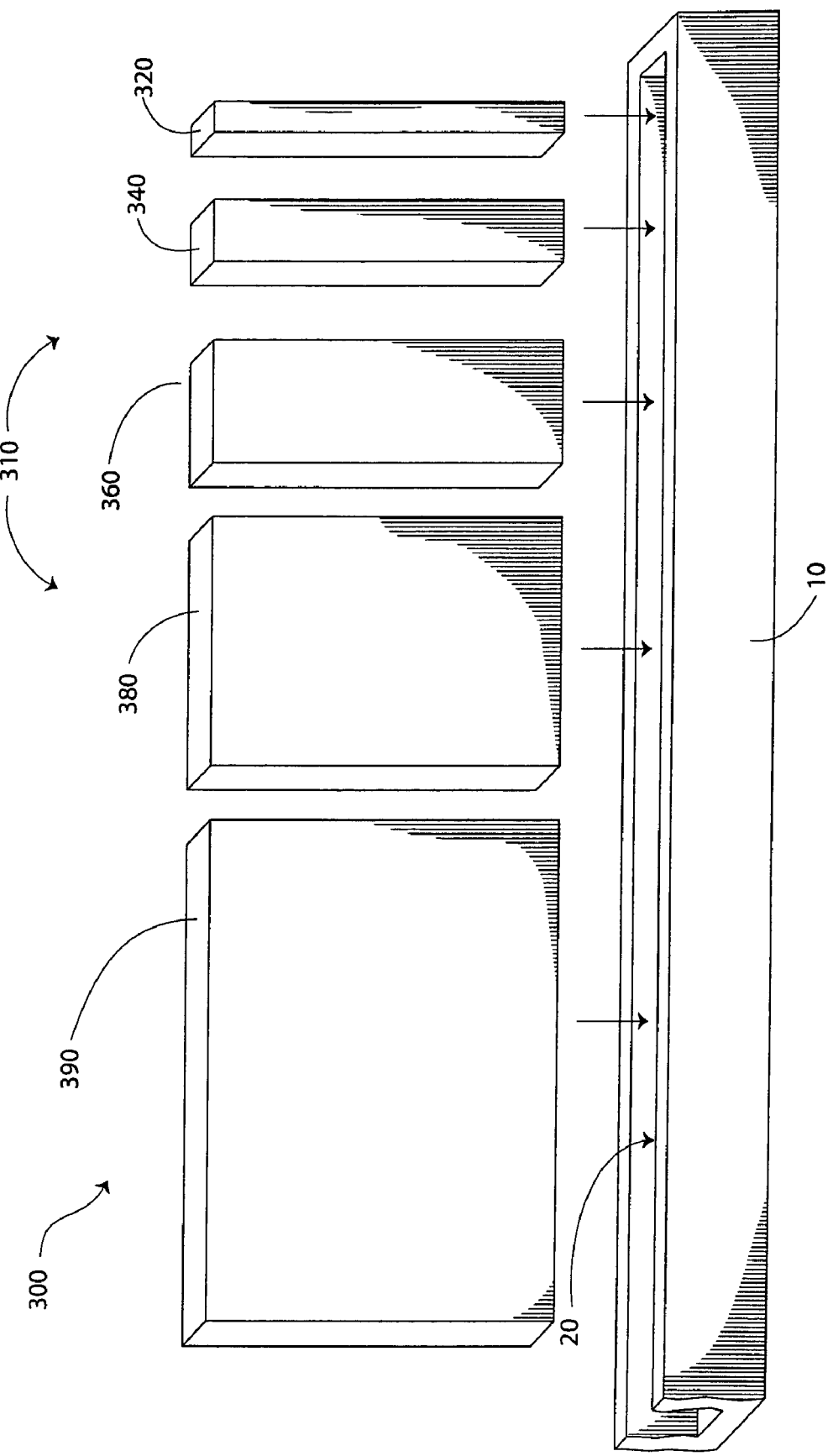

MEASUREMENT SYSTEM APPARATUS AND METHOD OF TEACHING UNITS OF MEASUREMENT

CROSS-REFERENCE TO RELATED APPLICATIONS

This application is a continuation-in-part application which claims benefit of U.S. patent application Ser. No. 11/290,856 filed Nov. 30, 2005, now U.S. Pat. No. 7,632,099, entitled "Measurement System Apparatus, and Method of Teaching Units of Measurement" which is incorporated herein by reference.

BACKGROUND OF THE INVENTION

1. Field of the Invention

The present invention generally relates to educational devices. More particularly, the present invention relates to a measurement system apparatus and method for teaching units of measurement.

2. Description of the Related Art

Simply viewing a measurement device such as a ruler or measuring cup having units of measurement and comprehending those units can be a challenging task for a young student. Perceiving and conceptualizing increments of measurement may be especially difficult for students with learning disabilities. One method of alleviating this difficulty is through the use of visual educational tools.

Various attempts have been made to construct visual indicia for teaching measurement systems. In one instance, U.S. Pat. No. 480,119 discloses identically sized inseparable blocks connected in a linear array for teaching a variety of measurement systems. In another instance, U.S. Pat. No. 2,635,355 discloses an educational tool having sequentially sized blocks used to illustrate different values to teach addition and subtraction. This tool, however, is not used to teach a measurement system.

Still other education tools have been provided having various measurement pieces. The apparatus disclosed in U.S. Pat. No. 3,465,453 utilizes discs to illustrate the relationship between the radius and circumference of a circle. In another instance, an educational device as disclosed in U.S. Pat. No. 6,033,282 provides a built-up measuring device having elements adapted to receive a plurality of cubes.

Therefore, there is a need for a new educational tool capable of aiding the student's comprehension of various measurement systems. Further, there is a need for an educational tool for teaching measurement systems having measurement unit pieces capable of representing various units of measurement. Further, there is a need for a method of teaching measurement systems through the use of an apparatus capable of receiving measurement pieces as visual aids. Various embodiments of a measurement system apparatus are offered here which meet certain of these needs.

SUMMARY OF THE INVENTION

A measurement system apparatus is first provided. The apparatus in one embodiment includes an elongated bar having opposing ends, and a plurality of discrete measurement unit pieces received along the bar. The elongated bar is metered in accordance with a measurement system. Each measurement unit piece represents an incremental unit of the measurement system.

The measurement system in the apparatus may be a system of length or a system of volume or any other measurement system. Examples in a linear system may include the English standard system having incremental units of $\frac{1}{2}$, $\frac{1}{4}$, $\frac{1}{8}$, and $\frac{1}{16}$ inches, or a metric system having incremental units of decimeters and at least one meter. Examples in a volumetric system may include an English standard system having incremental units of cups, quarts and gallons, or a metric system having incremental units of milliliters and at least one liter. The values of the measurement unit pieces may be correlated by size, color, or other means.

In one aspect, the elongated bar includes a base, opposing side walls along the base, and a channel defined by the opposing side walls wherein at least one of the side walls is metered.

In another aspect, the elongated bar includes a base, opposing side walls along the base, opposing end walls perpendicular and contiguous to the side walls, wherein the height of the end walls is greater than the height of the contiguous side walls, a channel defined by the opposing side walls and the opposing end walls wherein at least one of the side walls is metered, a back wall contiguous to one of the side walls on the side opposite the channel, wherein the height of the back wall is greater than the height of the contiguous side wall, and a shelf defined by the back wall and the top surface of the contiguous side wall.

A method of instructing a student as to a measurement system is also provided. In one embodiment, the method includes the step of providing an elongated bar, with the bar being metered along its length to reflect incremental units of a measurement system. The incremental units are preferably fractions of the measurement system, such as $\frac{1}{2}$, $\frac{1}{4}$, $\frac{1}{8}$, and $\frac{1}{16}$ inches, or $\frac{1}{10}$ and $\frac{1}{100}$ meters, or other fractional units of the measurement system. The method also includes the step of providing a plurality of measurement unit pieces corresponding to the metered incremental units of the measurement system. In addition, the step of placing selected measurement unit pieces along the elongated bar is provided. In addition, the step of placing a second portion of measurement unit pieces contiguous with the first set of measurement pieces, to demonstrate arithmetic functions such as addition, subtraction, multiplication and division of the incremental units of the measurement system, is provided. Examples may include demonstrating one group of incremental unit measurements added to, subtracted from, multiplied by or divided by another group of incremental measurement units.

The metered units may be units of length, volume, or other measurement system. The system may be either metric, standard English, or other system. The metered units may also be representative of a musical system, depicting whole notes and subunits thereof.

BRIEF DESCRIPTION OF THE DRAWINGS

So that the manner in which the above recited features of the present invention can be better understood, certain drawings are appended hereto. It is to be noted, however, that the appended drawings illustrate only selected embodiments of the inventions and are therefore not to be considered limiting of scope, for the inventions may admit to other equally effective embodiments and applications.

FIG. 3 presents a perspective view of a measurement system apparatus of the present invention, in an alternative embodiment.

DETAILED DESCRIPTION

Definitions

As used herein, the term "bar" refers to any elongated object for receiving measurement unit pieces, and may be fabricated from any material. The bar may be a physical object or may be an object graphically represented through a computer-implemented program.

As used herein, the term "measurement unit piece" refers to any object representing a measurement system unit, and may be fabricated from any material. The measurement unit piece may be a physical object or may be an object graphically represented through a computer-implemented program.

As used herein, the term "unit" refers to any structural or functional constituent of a whole and may be based in the English standard system or metric system.

Description of Specific Embodiments

Figure 1:
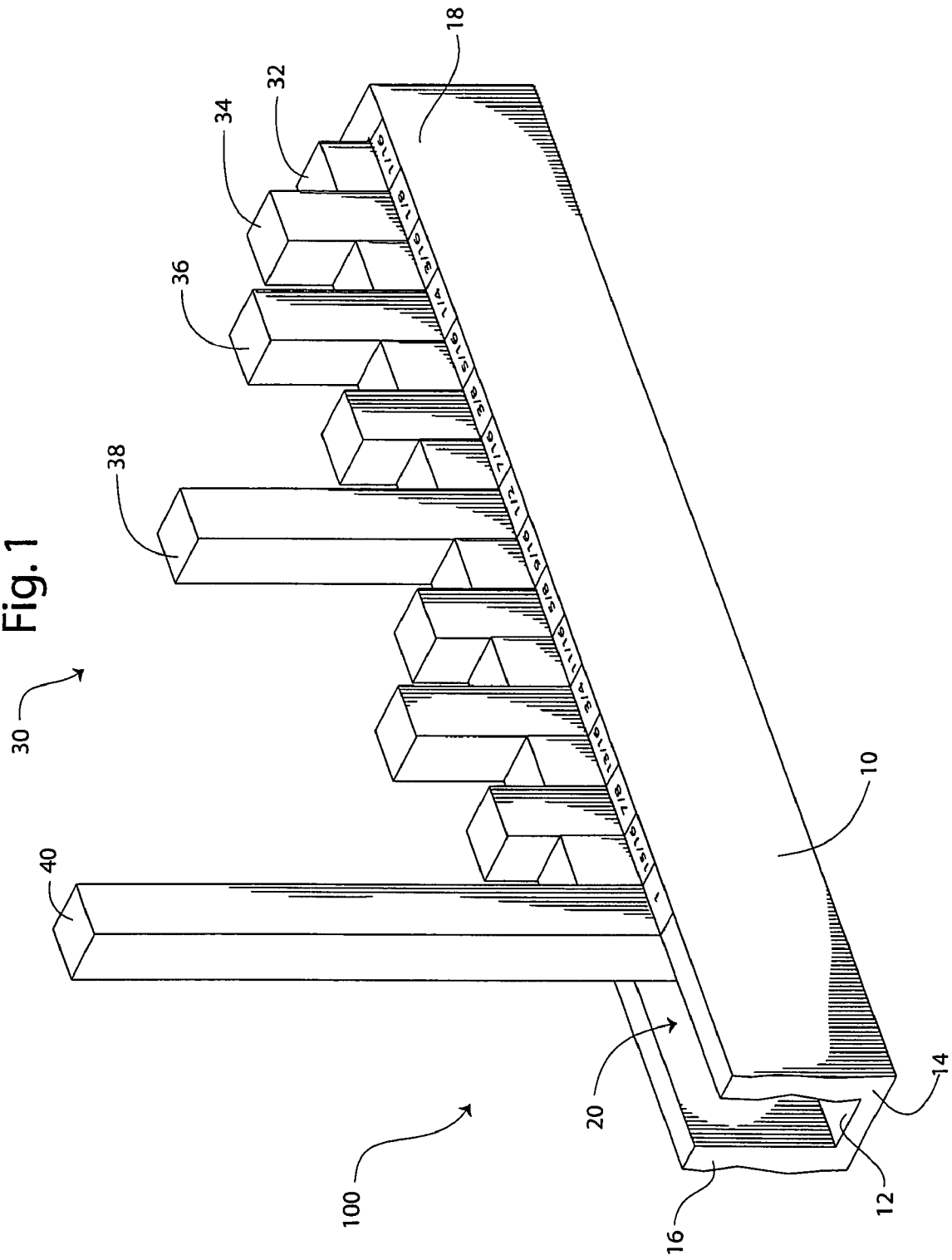
FIG. 1 presents a perspective view of a measurement system apparatus of the present invention, in one embodiment.

FIG. 1 presents a perspective view of a measurement system apparatus 100 of the present invention, in one embodiment. The apparatus 100 first comprises an elongated bar 10. The bar 10 has a base 12 and two side walls 14, 16. In the arrangement of FIG. 1, the base 12 and two side walls 14, 16 define an elongated channel 20. As will be described further below, the channel 20 is configured to receive a plurality of discrete measurement unit pieces 30.

The elongated bar 10 has two opposing ends. A first end is shown at 18 in FIG. 1. The second end is not seen, as the bar 10 is broken for illustrative purposes. Preferably, each end is closed to define the channel 20.

The elongated bar 10 is metered. More specifically, the bar 10 is metered along its length to reflect increments of a measurement system. In the representative bar 10 of FIG. 1, the measurement system is an English standard system for measuring inches. The bar 10 is intentionally metered to a larger scale, such as 10:1 or greater, so as to aid the student in more clearly seeing the incremental units that make up an inch. In the bar 10 of FIG. 1, a single inch is seen metered, with 1/16 inch increments provided. However, the bar 10 will preferably have multiple inches metered along its length. In one embodiment, at least two inches are metered. Preferably, the two inches are incremented so as to actually extend along a length of one and one-half feet, though any length that permits the incremental unit pieces 30 to be easily distinguished and manipulated, either manually or through a graphical user interface, may be provided.

It can also be seen from FIG. 1 that the metered units are written onto the bar 10. In the bar 10, 1/16 inch units are provided. In one aspect, a separate measurement unit piece 30 is placed contiguously along bar 10 to correspond with the individual metered units, or increments. For the bar 10, 16 separate increments are provided for receiving 16 separate measurement unit pieces 30. Again, this is only exemplary, and it is preferred that 32 separate increments be provided for receiving 32 separate measurement unit pieces 30 representing two inches. It is also again noted that the length of the bar 10 should be sufficient to permit the student to easily read the increments along the bar 10. For this reason, the increments should preferably be at a much larger scale than the actual size, such as 10:1 or greater, especially where a smaller measurement system such as inches is being taught.

According to the present invention, different measurement unit pieces 30 will be denoted to indicate a corresponding increment. In the arrangement of FIG. 1, separate measurement unit pieces are provided representing 1/16, 1/8, 1/4, 1/2 and 1 inch increments. Specifically, unit pieces 32 represent the 1/16 increment positions; unit pieces 34 represent the 1/8 inch increment positions; unit pieces 36 represent the 1/4 inch increment positions; unit piece 38 represents the 1/2 inch increment positions; and unit piece 40 represents the 1 inch increment positions.

Figure 2:
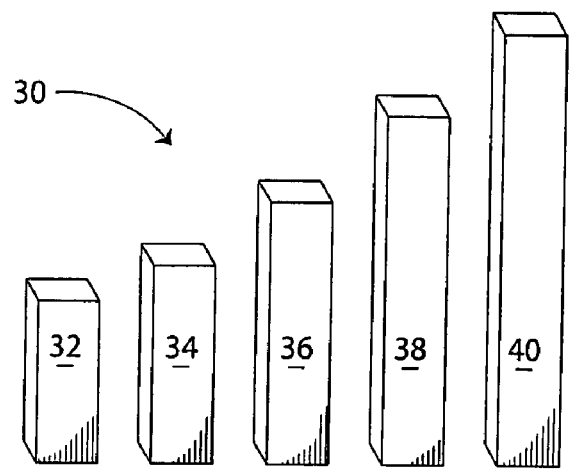
FIG. 2 presents a perspective view of certain of the measurement unit pieces used in the system of FIG. 1.

FIG. 2 presents a perspective view of each of the measurement unit pieces 30 used in the system 10 of FIG. 1. These are separately identified at 32, 34, 36, 38 and 40. Each unit piece 30 may have a different length in order to denote a correlation to a different increment of measurement. However, it is within the scope of the present invention to employ other means for denoting different increments of measurement. For example, different colors or different profiles may alternatively be employed. Preferably, both length and color are used to identify the separate measurement unit pieces 32, 34, 36, 38, 40. In this way, the measurement unit pieces 30 are individually identifiable.

It is also understood that the measurement system apparatus 100 may be used not just to identify linear units in the English system; the apparatus 100 may alternatively be used to identify linear units in the metric system. Thus, for example, the increments may be provided at 1/10, 1/2 and 1 centimeter. Alternatively, the increments may be provided at 1/100 (cm), 1/10, 1/2 and 1 meter. Alternatively, the increments may be provided in English units on one side of the elongated bar 10, and in equivalent metric units on the other side of the elongated bar 10. In this instance, separate measurement unit pieces in English and in metric would be provided.

The measurement system apparatus 100 may be used not only to identify linear units; the apparatus 100 may be used to identify volumetric units either in the English system or in the metric system. For example, where the English system is employed, the apparatus 100 may indicate increments such as ounces, cups, pints, quarts and gallons.

Figure 6:
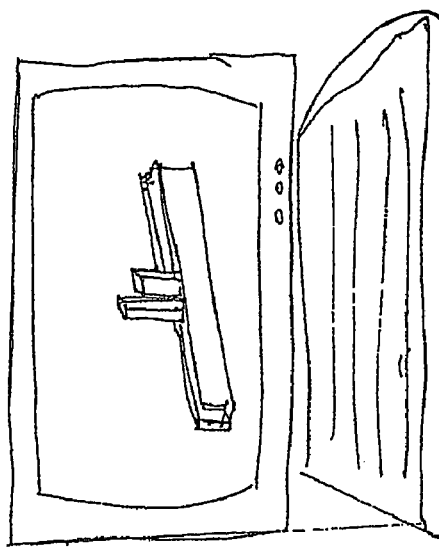
FIG. 6 presents a view of a computer and video monitor displaying the invention in the form of graphical elements.

It is also noted that the elongated bar 10 need not be a physical device; the bar 10 and its measurement unit pieces 30 may be graphically presented through graphics on a graphics user interface, as shown in FIG. 6. The student would thus add or remove pieces through a software program installed on a processing unit, or computer. In one example embodiment, a system for teaching units of measure using a visual graphics display means is provided, the system comprising a means for visually displaying a plurality of predetermined graphics in response to a user command, said predetermined graphics being representative of elements of a system for teaching units of measure. In other embodiments, the elements of a system for teaching units of measure further comprise an elongated bar having substantially parallel opposing walls disposed along a longitudinal portion thereof, thereby establishing a channel shaped space between said opposing walls, wherein at least one of said opposing walls is metered in accordance with the units of a measurement system; and a plurality of discrete colored measurement unit pieces of various sizes and shapes, said measurement unit pieces extending transversely from said elongated bar so as to illustrate in two dimensions a magnitude relationship between and amongst the sizes and shapes of said plurality of measurement unit pieces. In other embodiments, the measurement system further comprises a system of length. In further embodiments, the elongated bar is metered in accord with at least two measurement systems, wherein one of said two measurement systems is represented on one side of said elongated bar and the other of said two measurement systems is represented on an opposing side. In still further embodiments, the individual measurement unit pieces represent incremental units of ½, ¼, ⅛, and 1/16 inches, respectively. In still other embodiments, the measurement system further comprises a volumetric system, for example, a volumetric system metered according to either (or both) the English standard system or the metric standard system. In further embodiments, the English standard system further comprises incremental units of cups, quarts, and gallons. In still other embodiments, the visual graphics display means further comprises a computer equipped with software relating to the teaching of units of measure, and wherein graphics are visually displayed using an associated monitor in response to user commands, and in further embodiments still, the visual graphics display means further comprises a processor equipped with software relating to the teaching of units of measure, and wherein graphics are visually displayed using an associated monitor in response to user commands. In still further embodiments, an associated method of teaching units of measurement using a visual graphics display means is provided, the method comprising equipping a computer with software relating to the teaching of units of measure; and commanding said software to execute at least the following two steps, namely, a first step of displaying an elongated bar having substantially parallel opposing walls along a longitudinal portion thereof in communication with a channel shaped space foamed between said opposing walls, with at least one of said opposing walls being metered in accordance with the units of a measurement system; and a second step of displaying a plurality of discrete colored measurement unit pieces of various sizes and shapes in communication with said channel shaped space such that pieces extend transversely from said elongated bar so as to illustrate in two dimensions a magnitude relationship between and amongst the sizes and shapes of said plurality of measurement unit pieces. In other embodiments, the step of displaying said measurement unit pieces further comprises displaying such measurements in incremental units of ½, ¼, ⅛, and 1/16 inches, respectively. In still other embodiments, the step of displaying said measurement system further comprises displaying a volumetric system selected from the group consisting of the English standard system and a metric system. In further embodiments still, the step of displaying said measurement unit pieces further comprises displaying said measurement unit pieces in incremental units of cups, quarts and gallons.

FIG. 3 presents a perspective view of a measurement system apparatus of the present invention in an alternative embodiment 300. In this embodiment, separate measurement unit pieces 310 are provided representing the 1/16, ⅛, ¼, ½ and 1 inch increments denoted as 320, 340, 360, 380 and 390, respectively. The measurement unit pieces 310 are of varying proportional widths and can be placed contiguously along the elongated bar 10 to aid the student in understanding the relationship between the measurement increments. It is within the scope of the present invention to have the corresponding widths of the measurement unit pieces 310 representing metric increments such as centimeters, decimeters and meters. In one aspect, the channel 20 is wide enough to accommodate English unit and metric unit pieces side-by-side so that the student may visually correlate the two systems. Further, it is within the scope of the present invention to have measurement unit pieces 310 of varying, proportional widths representing both metric and English increments of volume.

Figure 4:
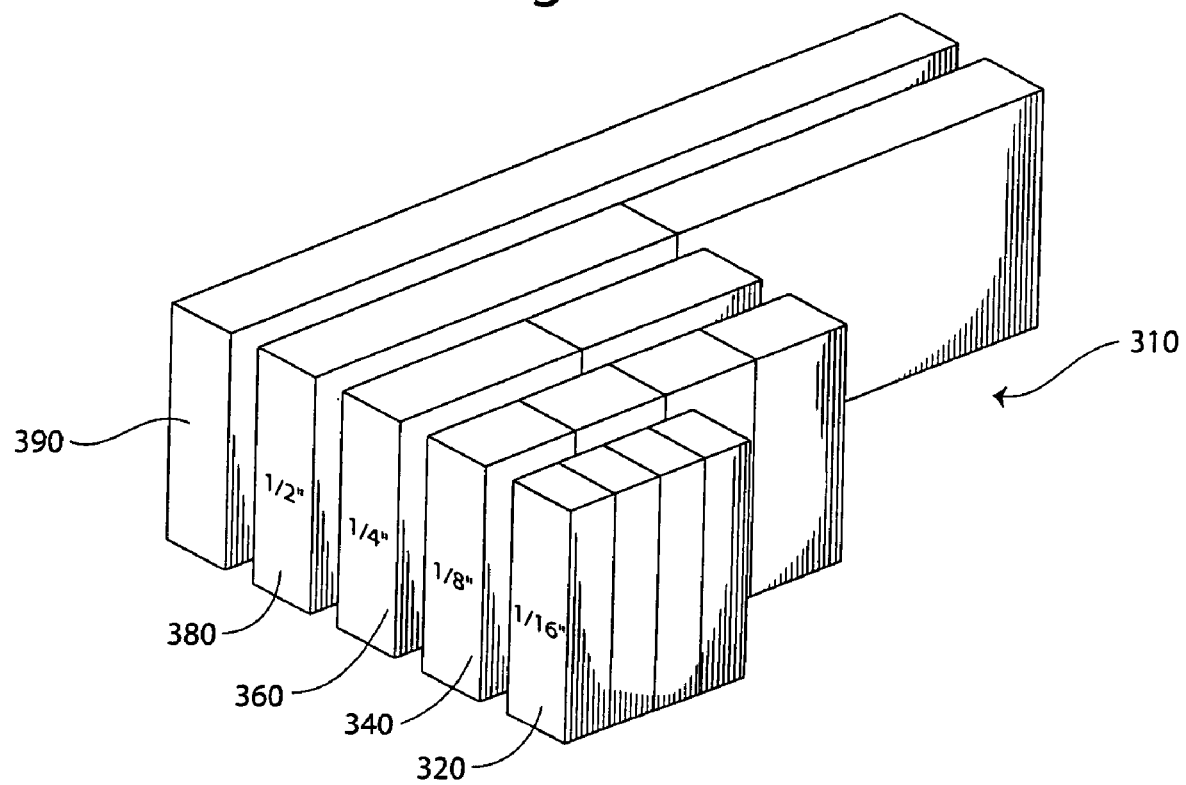
FIG. 4 presents an enlarged view of representative measurement unit pieces as may be part of the system of FIG. 3.

FIG. 4 presents an enlarged view of measurement unit pieces 310 that may be used in the system of FIG. 3. These are separately identified at 320, 340, 360, 380 and 390. Each unit piece 310 has a different width in order to denote a proportional relationship to a different increment of measurement. However, it is within the scope of the present invention to employ other means for denoting different increments of measurement. For example, different colors or different profiles may alternatively be employed. Preferably, both width and color are used to identify the separate measurement unit pieces 320, 340, 360, 380, 390. In this way, the measurement unit pieces are individually identifiable.

Figure 5:
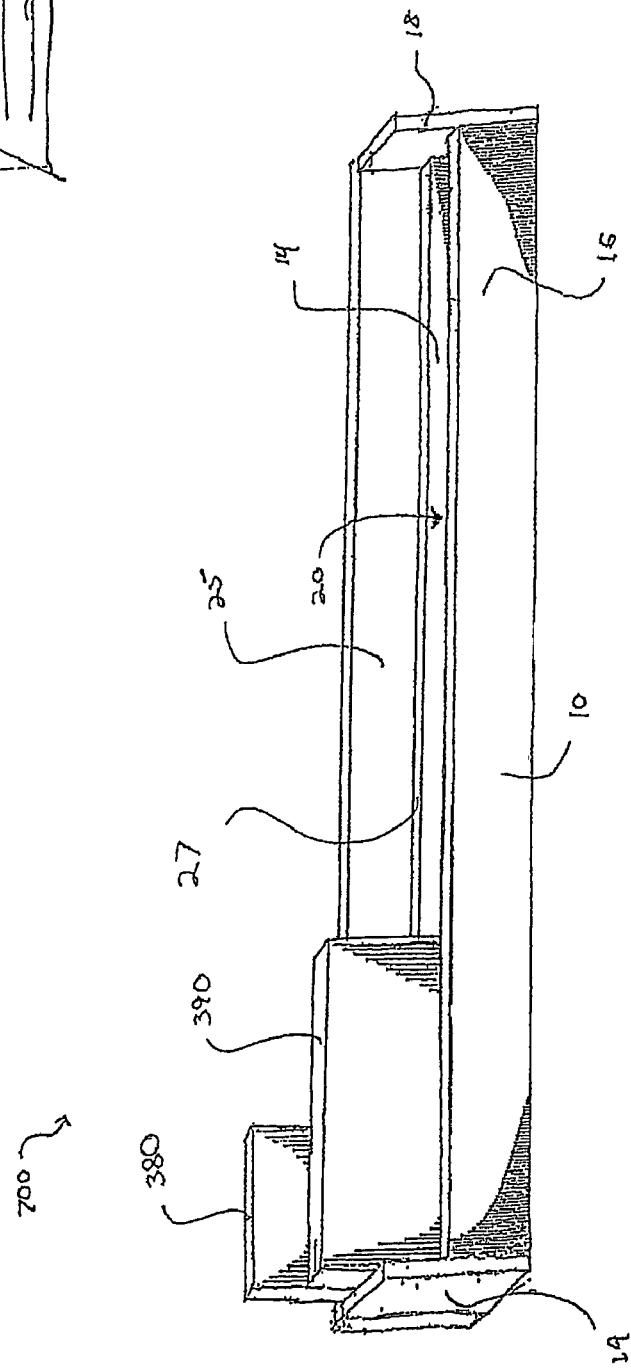
FIG. 5 presents a perspective view of a measurement system apparatus of the present invention, in yet an additional embodiment, containing opposing end walls and a back wall.

FIG. 5 presents a perspective view of a measurement system apparatus of the present invention in an alternative embodiment 700. The apparatus 700 comprises an elongated bar 10. The bar 10 has a base which is not seen, and two opposing side walls 14 and 16. In the arrangement of FIG. 5, the base and two side walls 14 and 16 define an elongated channel 20.

The elongated bar 10 has two opposing end walls, shown at 18 and 19 in FIG. 5, which opposing end walls have a height greater than that of the two side walls 14 and 16, and further define the channel 20.

The elongated bar 10 further includes a back wall 25, contiguous to the side wall 14 on the side opposite the channel 20, which back wall has a height greater than the side wall 14. The intersection of the back wall 25 and the side wall 14 defines a shelf 27.

In this embodiment, one set of separate measurement unit pieces may be placed contiguously in the channel 20, as demonstrated by the measurement unit piece 390. Further, a separate set of measurement unit pieces may be placed on the shelf 27, as demonstrated by the measurement unit piece 380. It is preferred that the two separate sets of measurement unit pieces be adjacent to one another, with the set on the shelf 27 being slightly raised above the set in the channel 20, so that the student may visually correlate and compare the two systems. For example, with reference to FIG. 5, measurement unit piece 390 may be twice the width of measurement unit piece 380, which relative sizes are more visually perceptible when the pieces 380, 390 are offset vertically from one another.

As noted, a method of instructing a student as to a measurement system is also provided. The method is disclosed in the context of the embodiment illustrated by FIG. 1 but may be performed through the use of any of the embodiments disclosed herein. In one aspect, the method first comprises the step of providing an elongated bar 10, with the bar 10 being metered along its length to reflect increments of a measurement system. A plurality of measurement unit pieces 30 corresponding to the metered increments of the measurement system is provided. The measurement unit pieces 30 are denoted to correspond to different increments of the measurement system. Preferably, the pieces 30 are denoted by both length and color as described above. For instance, 1/16 unit pieces 32 may be red; ¼ unit pieces 34 may be green; and so forth.

A first portion of the plurality of the measurement unit pieces 30 is placed along the elongated bar 30. The pieces 30 may be positioned in a channel 20. Alternatively, other holding arrangements such as a clip or magnetic attraction may be provided. The pieces 30 are positioned adjacent to one another and each piece 30 corresponds to a respective unit of measurement. In this way, a first measurement portion is produced. Where, for example, the measurement system is linear, then the first measurement is a measurement of length.

In one aspect, a second step of placing a second portion of the plurality of the measurement unit pieces 30 along the elongated bar 10 is provided. The pieces of the second portion are positioned adjacently so as to individually correspond to a respective unit of measurement. In addition, the pieces of the second portion are placed adjacent to the pieces of the first portion so that a second measurement is produced from the combined first and second portions. Where the measurement system is linear, then the second measurement is a measurement of length.

In another aspect, the method includes the step of removing some of the first portion of the plurality of the measurement unit pieces from along the elongated bar 10. In this way, a second measurement is produced that is less than the first measurement.

In another aspect, disclosed in the context of the embodiment illustrated by FIG. 5, the above referenced steps take place with measurement unit pieces placed in the channel 20, as well as with measurement unit pieces placed on the shelf 27. In this way, the measurements of the two portions can be compared to each other, demonstrating visually to the student the difference between the two measurements by virtue of the vertical offset between the measurement unit pieces. Additionally, the two measurement portions can be of equal total value, but contain measurement unit pieces of individual sizes different than the other measurement portion, to demonstrate through basic arithmetic functions such as addition, subtraction, multiplication or division that the sum, difference, product or quotient of certain individual pieces of one portion equals the total measurement of the other portion.

Using this method, the student may more fully and quickly comprehend the structure of any given measurement system and its corresponding incremental units.

It should again be understood that the disclosed embodiments are merely exemplary of the inventions, which may be embodied in various forms. Therefore, the details disclosed herein are not to be interpreted as limiting, but merely as the basis for the claims and as a basis for teaching one skilled in the art how to make and/or use the invention.

I claim:

1. A system for teaching units of measure using a visual graphics display means, the system comprising:
   (a) a means for visually displaying a plurality of predetermined graphics in response to a user command, said predetermined graphics being representative of elements of a system for teaching units of measure, wherein said elements of a system for teaching units of measure further comprise:
   (b) an elongated bar having substantially parallel opposing walls disposed along a longitudinal portion thereof, thereby establishing a channel shaped space between said opposing walls, wherein at least one of said opposing walls is metered in accordance with the units of a measurement system; and
   (c) a plurality of discrete colored measurement unit pieces of various sizes and shapes, said measurement unit pieces extending transversely from said elongated bar so as to illustrate in two dimensions a magnitude relationship between and amongst the sizes and shapes of said plurality of measurement unit pieces.

2. The system of claim 1, wherein said measurement system further comprises a system of length.

3. The system of claim 1, wherein said elongated bar is metered in accord with at least two measurement systems, wherein one of said two measurement systems is represented on one side of said elongated bar and the other of said two measurement systems is represented on an opposing side.

4. The system of claim 1, wherein individual measurement unit pieces represent incremental units of ½, ¼, ⅛, and 1/16 inches, respectively.

5. The system of claim 1, wherein the measurement system further comprises a volumetric system.

6. The system of claim 5, wherein said volumetric system is metered according to the English standard system.

7. The system of claim 5, wherein said volumetric system is metered according to the metric standard system.

8. The system of claim 6, wherein said English standard system further comprises incremental units of cups, quarts, and gallons.

9. The system of claim 1, wherein said visual graphics display means further comprises a computer equipped with software relating to the teaching of units of measure, and wherein graphics are visually displayed using an associated monitor in response to user commands.

10. The system of claim 1, wherein said visual graphics display means further comprises a processor equipped with software relating to the teaching of units of measure, and wherein graphics are visually displayed using an associated monitor in response to user commands.

11. A method of teaching units of measurement using a visual graphics display means, the method comprising:
   equipping a computer with software relating to the teaching of units of measure; and
   commanding said software to execute at least the following two steps:
   a first step of displaying an elongated bar having substantially parallel opposing walls along a longitudinal portion thereof in communication with a channel shaped space formed between said opposing walls, with at least one of said opposing walls being metered in accordance with the units of a measurement system; and
   a second step of displaying a plurality of discrete colored measurement unit pieces of various sizes and shapes in communication with said channel shaped space such that pieces extend transversely from said elongated bar so as to illustrate in two dimensions a magnitude relationship between and amongst the sizes and shapes of said plurality of measurement unit pieces.

12. The method of claim 11, further comprising:
   displaying said measurement unit pieces in incremental units of ½, ¼, ⅛, and 1/16 inches, respectively.

13. The method of claim 11, further comprising:
   displaying said measurement system is a volumetric system selected from the group consisting of the English standard system and a metric system.

14. The method of claim 13, wherein when said measurement system is according to the English standard system, the method further comprises:
   Displaying said measurement unit pieces in incremental units of cups, quarts and gallons.

* * * * *